United States Patent
Kawada et al.

(10) Patent No.: US 9,808,864 B2
(45) Date of Patent: Nov. 7, 2017

(54) THREE DIMENSIONAL PRINTER

(71) Applicant: Sodick, Co., Ltd., Kanagawa (JP)

(72) Inventors: Shuichi Kawada, Kanagawa (JP); Katsutaka Muranaka, Kanagawa (JP); Shuji Okazaki, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 305 days.

(21) Appl. No.: 14/858,036

(22) Filed: Sep. 18, 2015

(65) Prior Publication Data
US 2016/0101469 A1    Apr. 14, 2016

(30) Foreign Application Priority Data

Oct. 8, 2014    (JP) .................... 2014-207128

(51) Int. Cl.
*B22F 3/10*    (2006.01)
*B22F 3/105*   (2006.01)
*B33Y 30/00*   (2015.01)
*B29C 67/00*   (2017.01)

(52) U.S. Cl.
CPC .......... *B22F 3/1007* (2013.01); *B22F 3/1055* (2013.01); *B29C 67/0077* (2013.01); *B29C 67/0085* (2013.01); *B33Y 30/00* (2014.12); *B22F 2003/1056* (2013.01); *Y02P 10/295* (2015.11)

(58) Field of Classification Search
CPC .................. B22F 3/1007; B22F 3/1055; B22F 2003/1056; B33Y 30/00; Y02P 10/295
See application file for complete search history.

(56) References Cited

U.S. PATENT DOCUMENTS

| 7,060,579 | B2 * | 6/2006 | Chidambaram | .... H01L 29/6656 257/E21.431 |
| 8,070,474 | B2 * | 12/2011 | Abe | ............ B29C 64/153 118/256 |
| 9,005,513 | B2 * | 4/2015 | Abe | ............ B22F 3/1055 264/497 |
| 9,126,367 | B1 * | 9/2015 | Mark | ............ B29C 70/20 |

(Continued)

FOREIGN PATENT DOCUMENTS

| JP | 2004-175093 A | 6/2004 |
| JP | 2006-124732 A | 5/2006 |

(Continued)

OTHER PUBLICATIONS

Japanese Office Action dated Jun. 30, 2015, in connection with corresponding Japanese Patent Application No. 2014-207128 (12 pgs.).

*Primary Examiner* — Nahida Sultana
(74) *Attorney, Agent, or Firm* — Maier & Maier, PLLC

(57) ABSTRACT

A lamination molding apparatus which can lower the oxygen concentration in a molding room in short time is provided. A lamination molding apparatus, including a molding room; a processing head; a driving device housing room housing a driving device moving the processing head; a partitioning section to partition the molding room from the driving device housing room; a discharging section to discharge gas in the molding room; and an inert gas supplying apparatus to supply the inert gas to both of the molding room and to the driving device housing room.

8 Claims, 15 Drawing Sheets

(56) References Cited

U.S. PATENT DOCUMENTS

| | | | |
|---|---|---|---|
| 2011/0109016 A1* | 5/2011 | Fuwa | B22F 3/1055 264/460 |
| 2012/0031817 A1 | 2/2012 | Yui | |
| 2014/0173690 A1* | 6/2014 | Ekberg | H04L 63/08 726/3 |
| 2016/0107233 A1* | 4/2016 | Kobayashi | B29C 67/0077 425/78 |
| 2016/0144429 A1* | 5/2016 | Mizutani | B22F 3/1055 425/78 |

FOREIGN PATENT DOCUMENTS

| | | |
|---|---|---|
| JP | 2009-078558 A | 4/2009 |
| JP | 2009-108350 A | 5/2009 |
| JP | 5250338 B2 | 3/2010 |
| JP | 2010-280173 A | 12/2010 |

\* cited by examiner

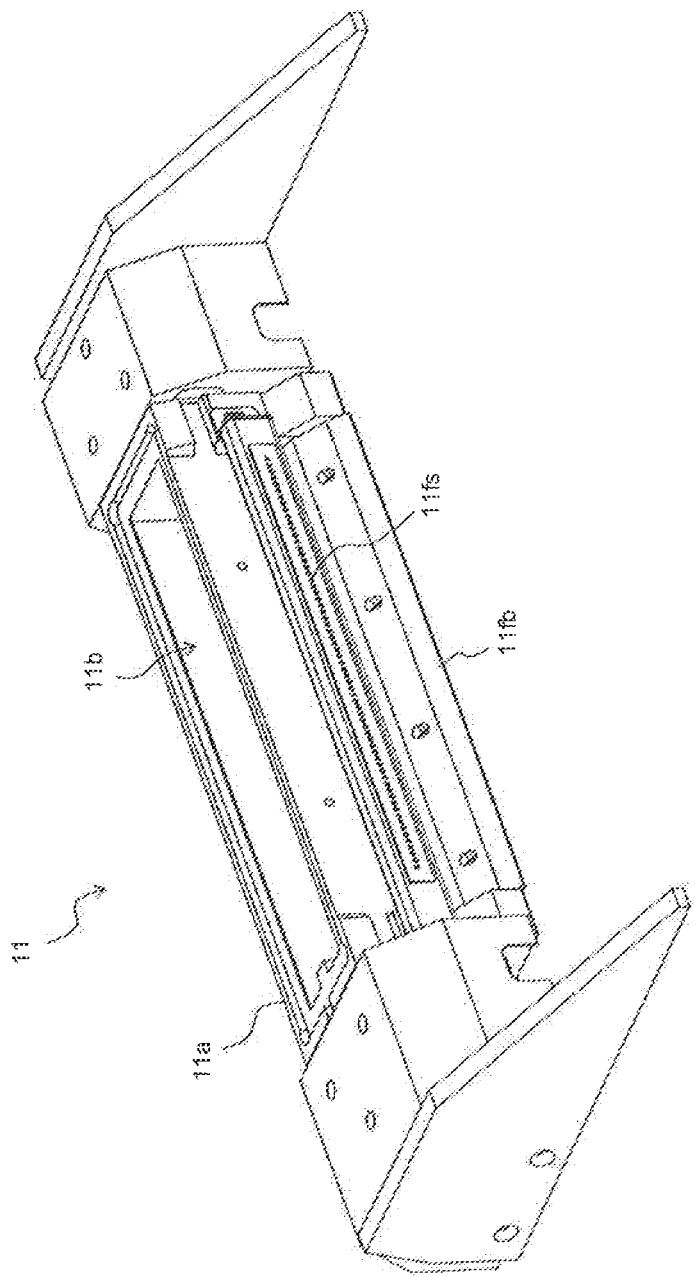

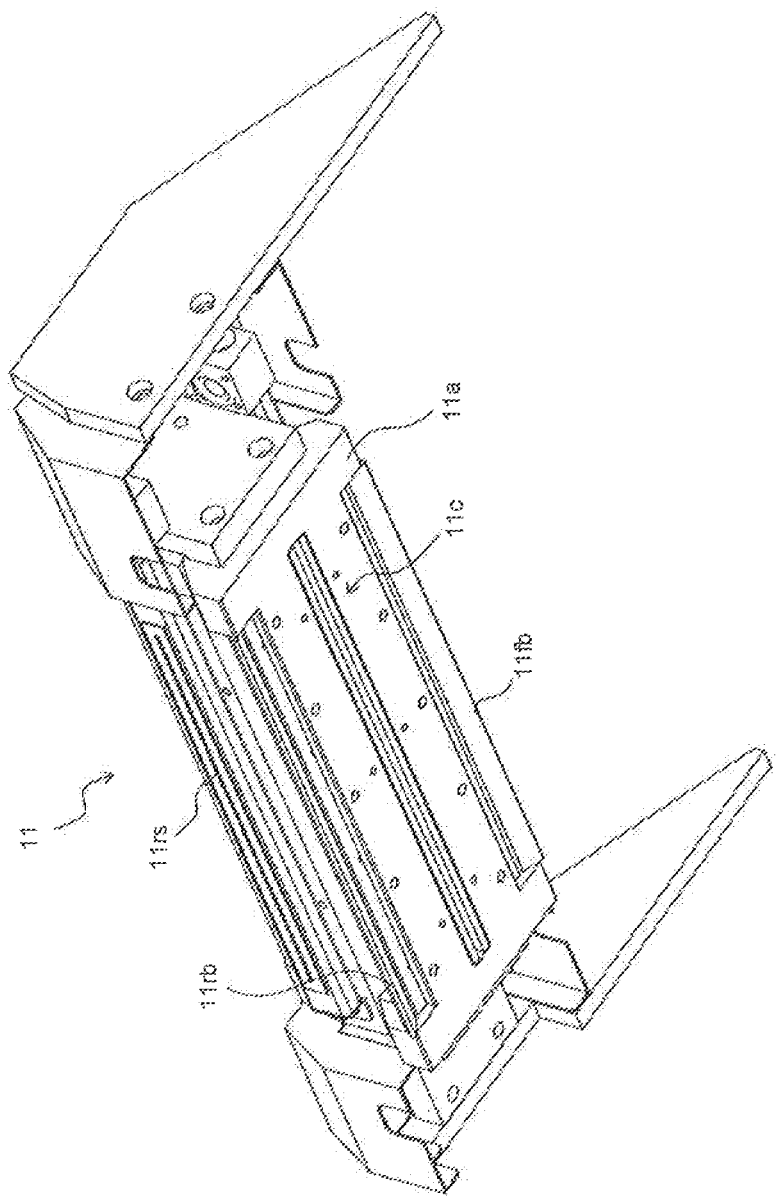

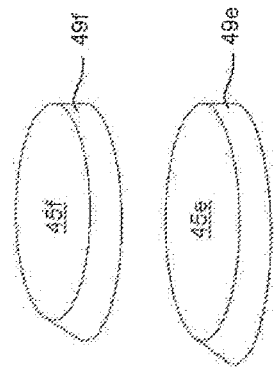
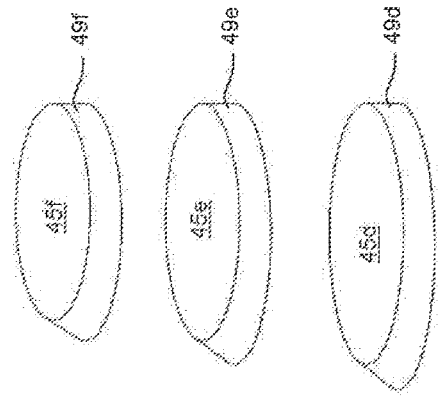
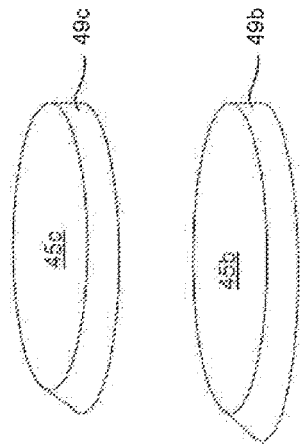
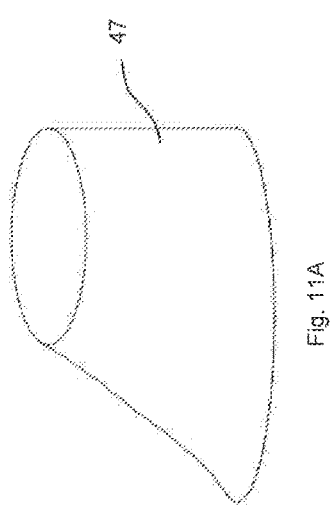
Fig. 11A
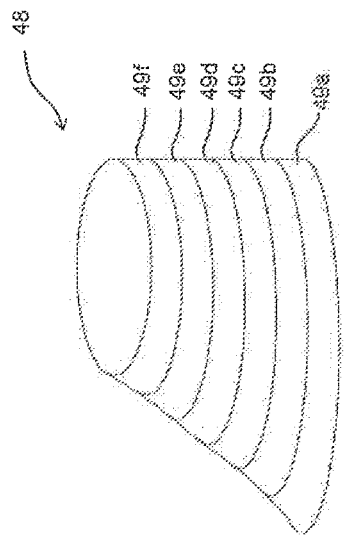
Fig. 11B

THREE DIMENSIONAL PRINTER

The present application claims priority from Japanese Patent Application No. 2014-207128, filed on Oct. 8, 2014, which is incorporated by reference herein in its entirety.

BACKGROUND OF THE INVENTION

Field of the Invention

The present invention relates to a lamination molding apparatus.

Background of the Invention

In a lamination molding method of metal using laser beam, a molding table capable of vertical movement is arranged in a molding room filled with nitrogen gas. Then, a very thin material powder layer is formed on the molding table. Subsequently, predetermined portions of this material powder layer are irradiated with the laser beam to sinter the material powder at the position of irradiation. These procedures are repeated to form a desired molded product.

In addition, a milling head to provide mechanical processing when molding the molded product, is provided in the molding room. The mechanical processing is carried out with respect to the surface or the unnecessary portions of the sintered body obtained by sintering the material powder. Here, the milling head is capable of being moved in the molding room (Patent Literature 1).

PRIOR ART DOCUMENTS

Patent Literature

[Patent Literature 1] JP 5250338B

SUMMARY OF INVENTION

Technical Problem

In Patent Literature 1, a driving mechanism for moving the milling head is provided in the molding room. Accordingly, the molding room becomes large for providing space for the driving mechanism. When the molded product is taken out, the door of the molding room is opened, causing increase in the oxygen concentration of the molding room. When the lamination molding is carried out in a condition where the oxygen concentration is high, the material powder becomes oxidized during sintering of the material powder, and thus would result in decrease in the quality of the molded product. Therefore, after the molded product is taken out, it is necessary to supply nitrogen gas into the molding room while the door of the molding room is shut, in order to lower the oxygen concentration of the molding room. Here, if the volume of the molding room is large, the time required to lower the oxygen concentration would become long, resulting in long waiting time until the next molding of the molded product starts.

The present invention has been made by taking these circumstances into consideration. An object of the present invention is to provide a lamination molding apparatus which can lower the oxygen concentration in the molding room with short time.

Means to Solve the Problem

According to the present invention, a lamination molding apparatus, comprising: a molding room, covering a predetermined molding region and being filled with an inert gas having a predetermined concentration; a laser beam emitter to irradiate a predetermined portion of a material powder layer formed on the molding region with a laser beam, thereby sintering the material powder at a position of irradiation to form a sintered body; a processing head structured so as to be capable of being moved in the molding room, the processing head providing a machine processing to the sintered body; a driving device housing room provided adjacent to the molding room, the driving device housing room housing a driving device moving the processing head; a partitioning section to partition the molding room from the driving device housing room; a discharging section to discharge gas in the molding room; and an inert gas supplying apparatus to supply the inert gas to both of the molding room and to the driving device housing room; wherein a communicating section is provided in the partitioning section, the communicating section allowing communication between the driving device housing room and the molding room; and the communicating section has a size allowing to maintain a pressure of the driving device housing room supplied with the inert gas to be higher than a pressure of the molding room, is provided.

Effect of the Invention

In the present invention, the size of the communicating section provided in the partitioning section to separate the molding room from the driving device housing room allows to maintain the pressure of the driving device housing room supplied with the inert gas to be higher than the pressure of the molding room. Accordingly, the pressure of the driving device housing room can be increased by supplying inert gas from the inert gas supplying apparatus while discharging gas in the molding room from the discharging section, thereby providing difference in the pressure between the driving device housing room and the adjacent molding room. Accordingly, flow of oxygen from the molding room into the driving device housing room can be prevented, while positively pulling the inert gas into the molding room from the driving device housing room. As such, the concentration of the inert gas in the driving device housing room can be maintained while swiftly increasing the concentration of the inert gas in the molding room which decreased when taking out the molded product and the like. Accordingly, the concentration of the inert gas in the driving device room and the molding room, that is, in the entire chamber can be increased efficiently and swiftly.

Hereinafter, various embodiments of the present invention will be provided. The embodiments provided below can be combined with each other.

Preferably, the lamination molding apparatus further comprises: a first inert gas supplying apparatus to supply the inert gas to the molding room; and a second inert gas supplying apparatus to supply the inert gas to the driving device housing room.

Preferably, the first inert gas supplying apparatus is configured to control the concentration of the inert gas; and the second inert gas supplying apparatus is not configured to control the concentration of the inert gas.

Preferably, an amount of the inert gas supplied to the molding room is larger than an amount of the inert gas supplied to the driving device housing room.

Preferably, the inert gas is supplied to the driving device housing room when a power source of the lamination molding apparatus is turned ON; and the inert gas is supplied to the molding room when a door allowing access to the molding room is closed.

Preferably, the partitioning section comprises bellows capable of extending and folding in a direction parallel to a boundary surface of the driving device housing and the molding room; and the processing head is capable of moving in an extending and folding direction of the bellows.

Preferably, the material powder layer is formed by moving the recoater head supplying the material powder on the molding region in the molding room.

BRIEF DESCRIPTION OF THE DRAWINGS

The above further objects, features and advantages of the present invention will become more apparent from the following detailed description taken in conjunction with the accompanying drawings, wherein;

FIG. 9 is a perspective view showing the recoater head 11.

FIG. 10 is a perspective view showing the recoater head 11 observed from another angle.

FIG. 11A is a perspective view showing the molded product 47 having the desired profile.

FIG. 11B is a perspective view showing the model of the molded product of FIG. 11A.

FIG. 11C is a perspective view showing the model of FIG. 11B sliced by a horizontal plane at a predetermined unit height.

DESCRIPTION OF THE PREFERRED EMBODIMENTS

Figure 1:
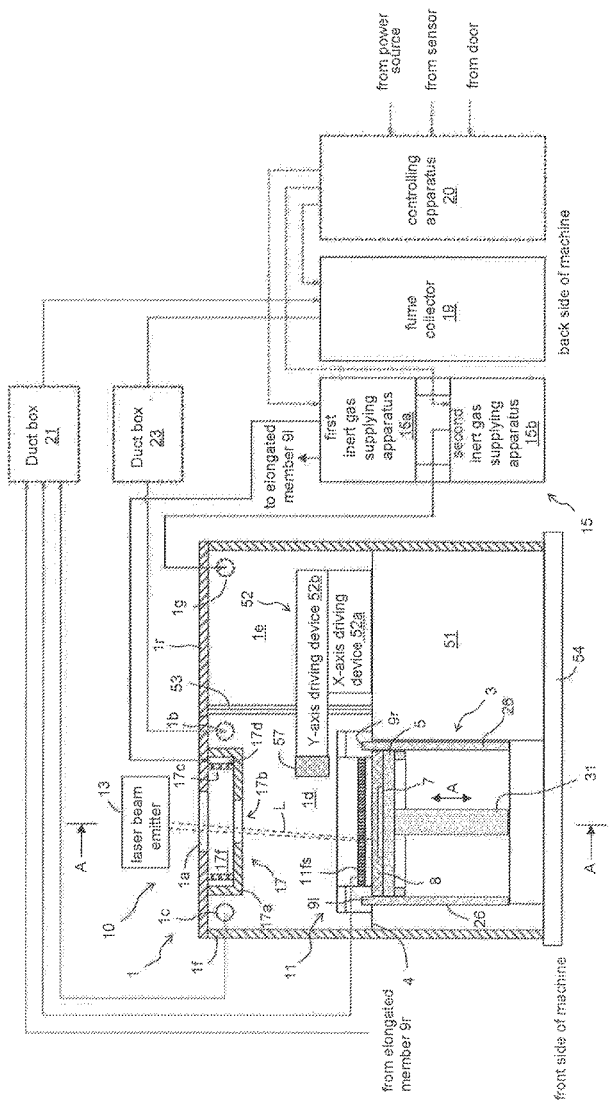
FIG. 1 is a rough structural diagram of the lamination molding apparatus and its peripheral apparatuses according to one embodiment of the present invention.
Figure 2:
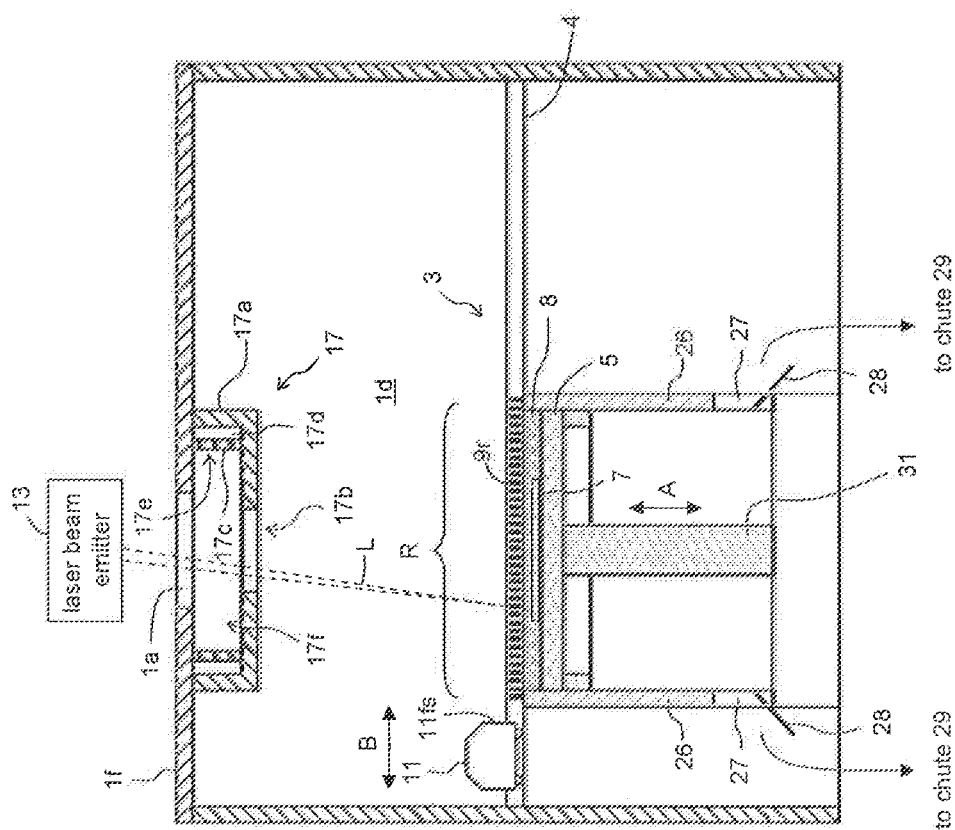
FIG. 2 is a cross sectional view taken along line A-A of FIG. 1 (left side view for the recoater head 11), showing only the front chamber 1f.

Hereinafter, the embodiments of the present invention will be described with reference to the drawings. Here, the characteristic matters shown in the embodiments can be combined with each other. In the following description, the directions of the X-axis, Y-axis, and Z-axis are as defined in FIG. 4.

As shown in FIGS. 1 to 8, the lamination molding apparatus 10 according to one embodiment of the present invention comprises a chamber 1; and a powder layer forming apparatus 3 and a driving device 52 which are provided in the chamber 1. The driving device 52 is provided on the bed 51. The powder layer forming apparatus 3 and the bed 51 are provided on the base 54. The chamber 1 is separated into a front chamber 1f and a rear chamber 1r. The molding room 1d is provided in the front chamber 1f, and the driving device housing room 1e is provided in the rear chamber 1r. The molding room 1d and the driving device housing room 1e are separated from each other by the X-axis bellows 53 capable of extending and folding.

Figure 7:
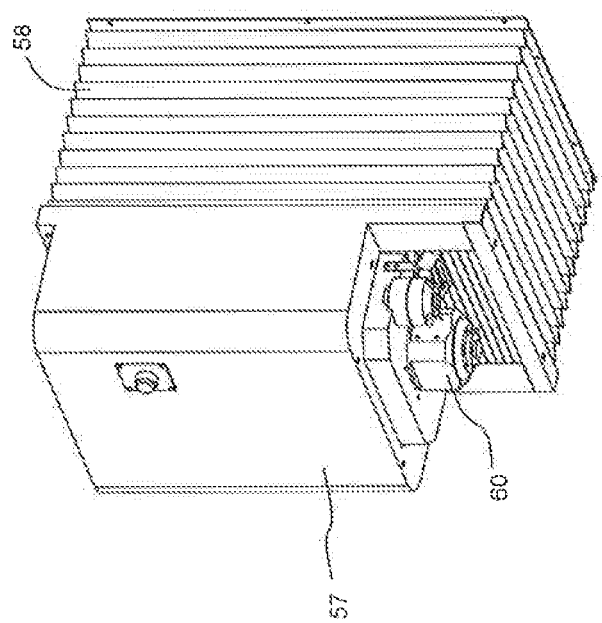
FIG. 7 is a perspective view showing the processing head 57 and the Y-axis bellows 58.

The driving device 52 comprises a Y-axis driving device 52b to move the processing head 57 provided in the molding room 1d in the Y-axis direction, and an X-axis driving device 52a to move the Y-axis driving device 52b in the X-axis direction. As shown in FIG. 7, the processing head 57 comprises a spindle head 60 and a Z-axis driving device (not shown) to move the spindle head in the Z-axis direction. The spindle head 60 is structured so as to be mounted with a rotary cutting tool such as an endmill, and to rotate such rotary cutting tool. With the afore-mentioned constitution, the processing head 57 can move the spindle head 60 to an arbitrary position in the molding room 1d, and perform mechanical processing to the sintered body 50 described later.

Figure 4:
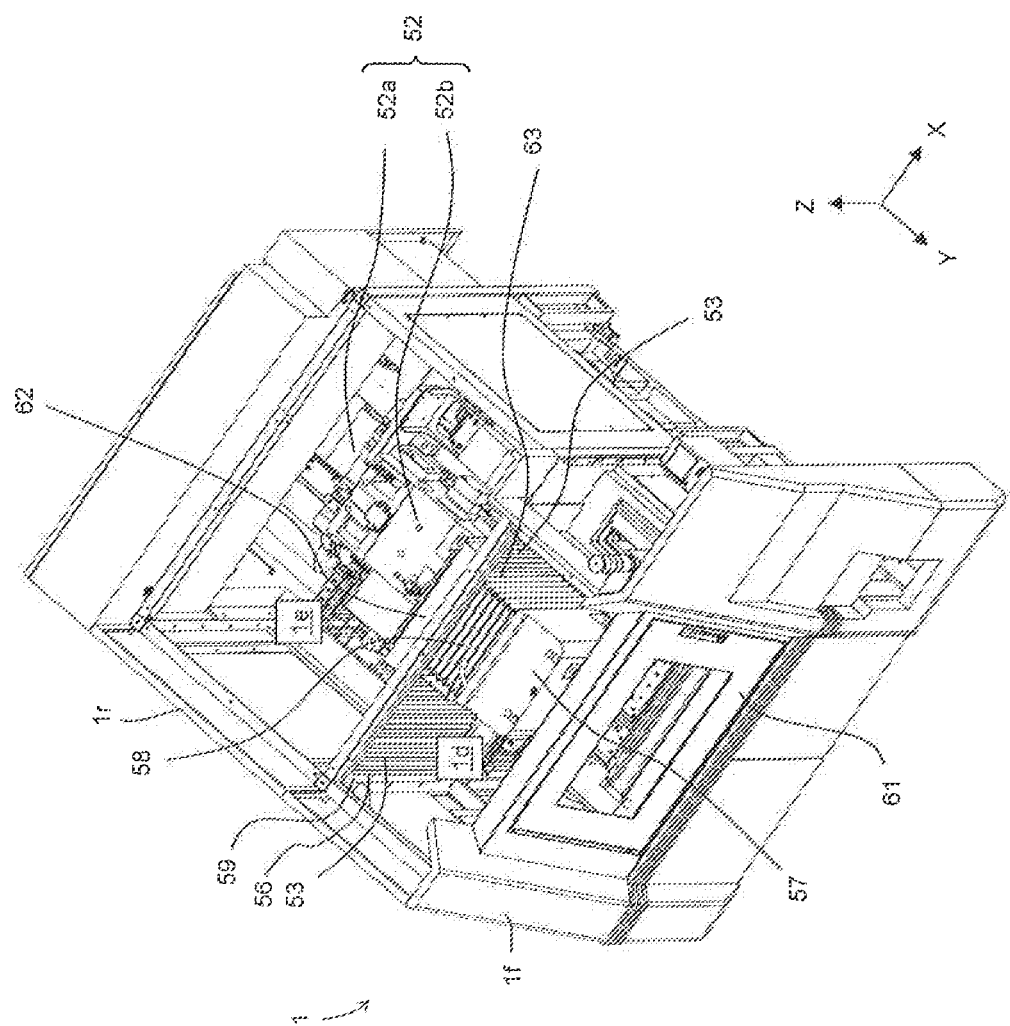
FIG. 4 is a perspective view of FIG. 3 where the top surface is removed.
Figure 5:
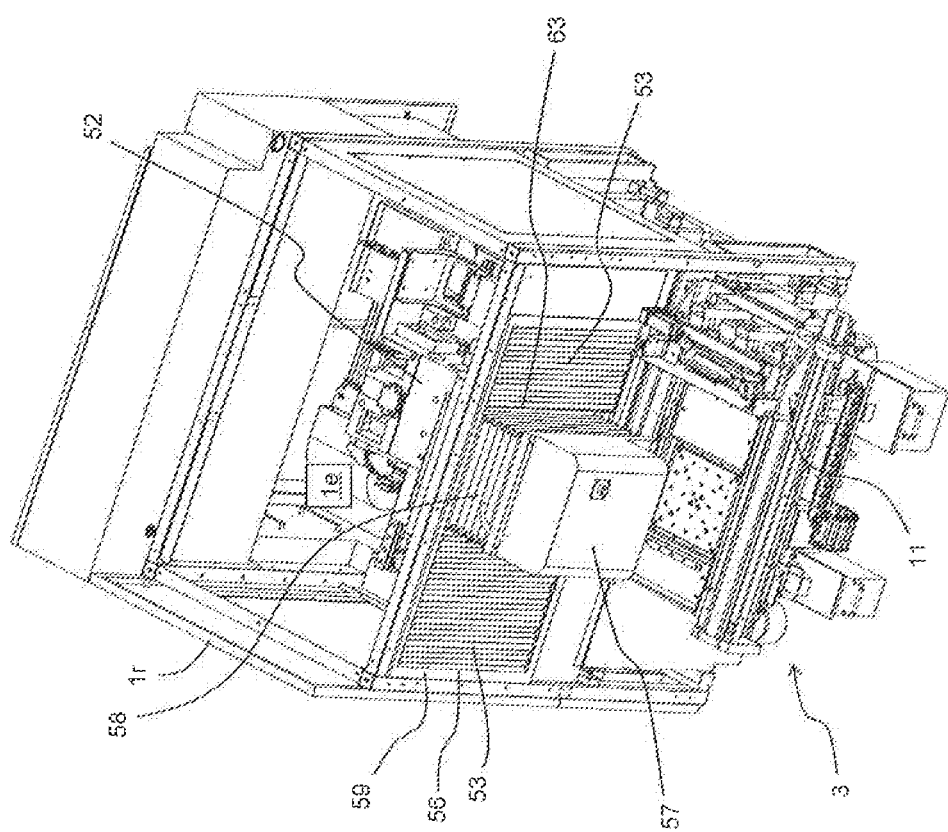
FIG. 5 is a perspective view of FIG. 3 where the front chamber if and the base 54 are removed.
Figure 6:
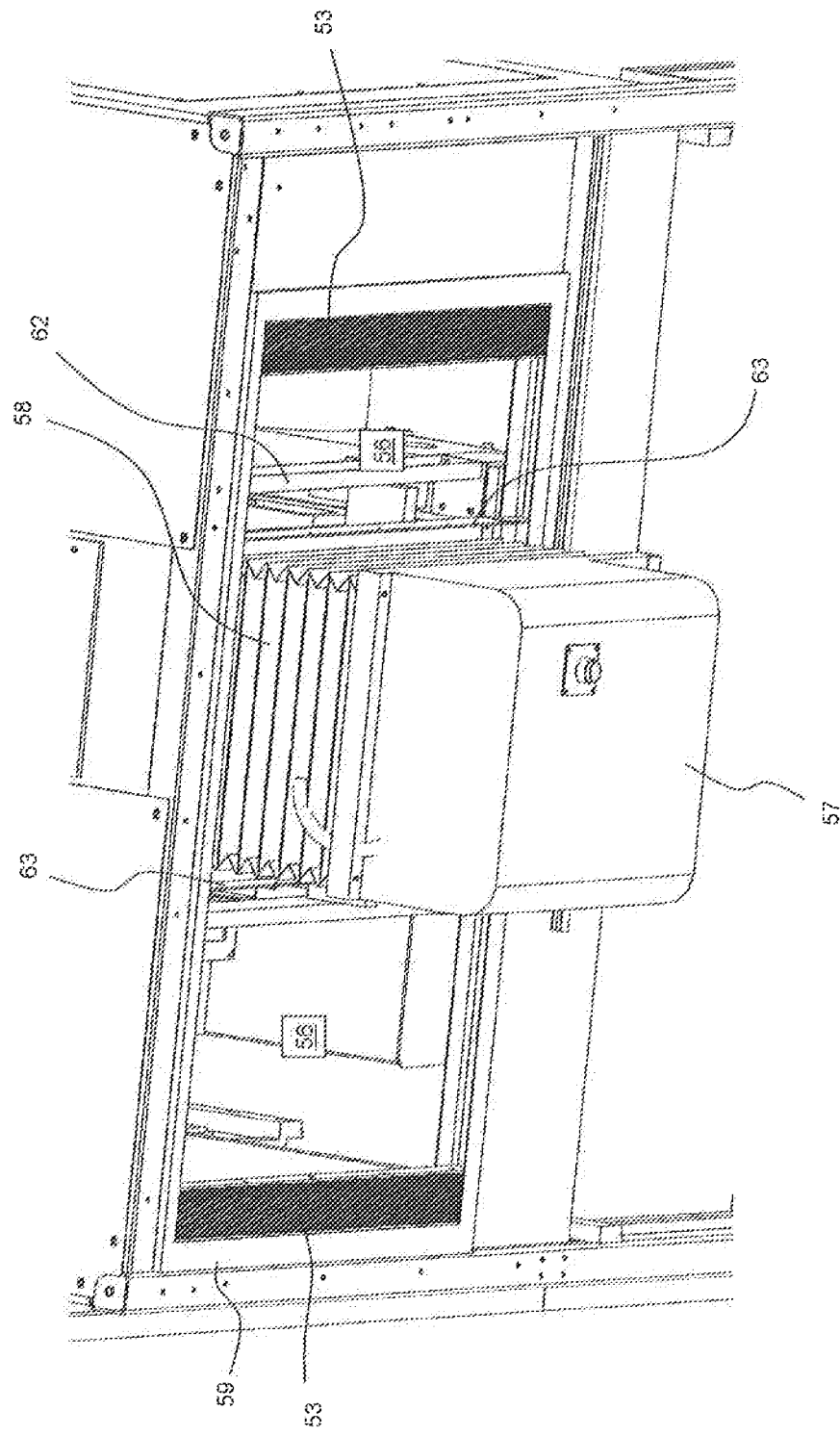
FIG. 6 is an enlarged view showing the vicinity of the dividing panel 59. Here, the X-axis bellows 53 are folded.

The Y-axis driving device 52b is provided so that the portion connected to the X-axis driving device 52a is arranged in the driving device housing room 1e, and the portion connected to the processing head 57 is arranged in the molding room 1d. As shown in FIGS. 4 and 5, the Y-axis bellows 58 capable of extending and folding surround the Y-axis driving device 52b. More specifically, as shown in FIG. 6, one end ox the Y-axis bellows 58 is fixed to the holding frame 63, and the other end of the Y-axis bellows 58 is fixed to the processing head 57. According to such constitution, the extension and folding of the Y-axis bellows 58 allows the movement of the processing head 57 in the Y-axis direction while maintaining both ends of the Y-axis bellows 58 fixed to the holding frame 63 and to the processing head 57, respectively.

As shown in FIGS. 1 to 6, a dividing panel 59 having an opening 56 is provided at the boundary of the molding room 1d and the driving device housing room 1e. The holding frame 63 is provided in the opening 56 of the dividing panel 59, and is fixed to the base portion of the Y-axis driving device 52b (the portion which does not move when the processing head 57 is moved in the Y-axis direction) via the bracket 62. In the opening 56, the X-axis bellows 53 capable of extending and folding are also provided. The X-axis bellows 53 comprise first X-axis bellows 53a provided at the right side of the holding frame 63, and second X-axis bellows 53b provided at the left side of the holding frame 63. The one end of the first and second X-axis bellows 53a and 53b are each fixed to the dividing panel 59, and the other end thereof are each fixed to the holding frame 63. According to such constitution, the extending and folding of the first and second X-axis bellows 53a and 53b allow the united movement of the Y-axis driving device 52b, the processing head 57, the holding frame 63, and the Y-axis bellows 58 in the X-axis direction while maintaining both ends of the first and second X-axis bellows 53a and 53b being fixed to the holding frame 63 and the dividing panel 59, respectively.

When the processing head 57 moves in the X-axis direction, the upper and lower ends of the first and second X-axis bellows 53a and 53b slide along the dividing panel 59, allowing extending and folding of the first and second X-axis bellows 53a and 53b. In order to achieve smooth extending and folding of the first and second X-axis bellows 53a and 53b, a slight gap is provided in between the upper and lower ends of the first and second X-axis bellows 53a and 53b and the dividing panel 59. As described later, the inert gas supplied into the driving device housing room 1e is mainly supplied to the molding room 1d through this gap. Accordingly, this gap serves as the communicating section between the driving device housing room 1e and the molding room 1d. Here, the communicating section can be formed by providing an opening in the dividing panel 59 or in the X-axis bellows 53.

As described, the molding room 1d and the driving device housing room 1e are separated from each other by the processing head 57, the holding frame 63, the Y-axis bellows 58, and the X-axis bellows 53, which constitute the "partitioning section". These constituents restrict the transferring of the inert gas between the molding room 1d and the driving device housing room 1e to a large extent. Accordingly, the concentration of the inert gas in the driving device housing room, 1e is maintained high even when the molding room 1d is exposed to the atmosphere. In addition, the fume generated in the molding room 1d can be prevented from being transferred to the driving device housing room 1e. Accordingly, malfunction of the driving device 52 caused by the entering of the fume can be suppressed.

Figure 3:
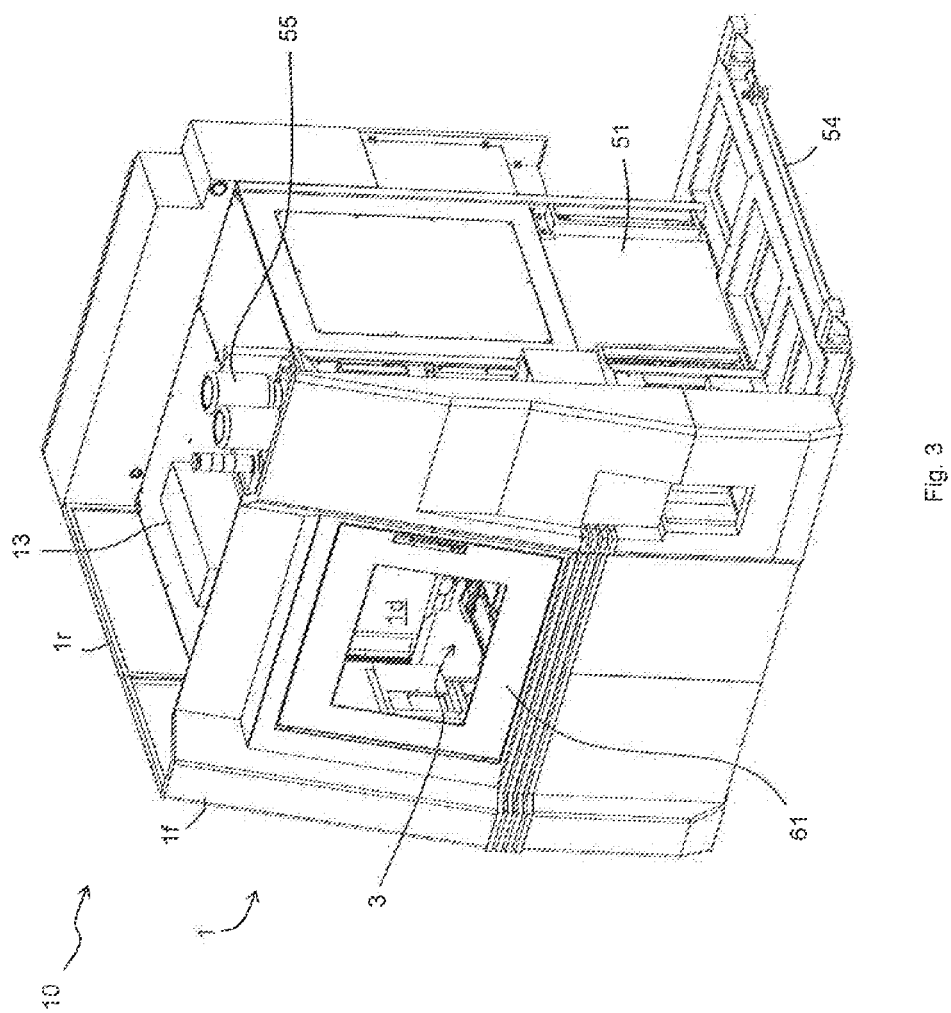
FIG. 3 is a perspective view of the entire lamination molding apparatus 10 of FIG. 1.

As shown in FIG. 3, the door 61 is provided on the front chamber 1f. Operation (taking out the molded product, removing the non-sintered material powder, and the like) in the molding room 1d can be performed by opening the door 61.

Figure 8:
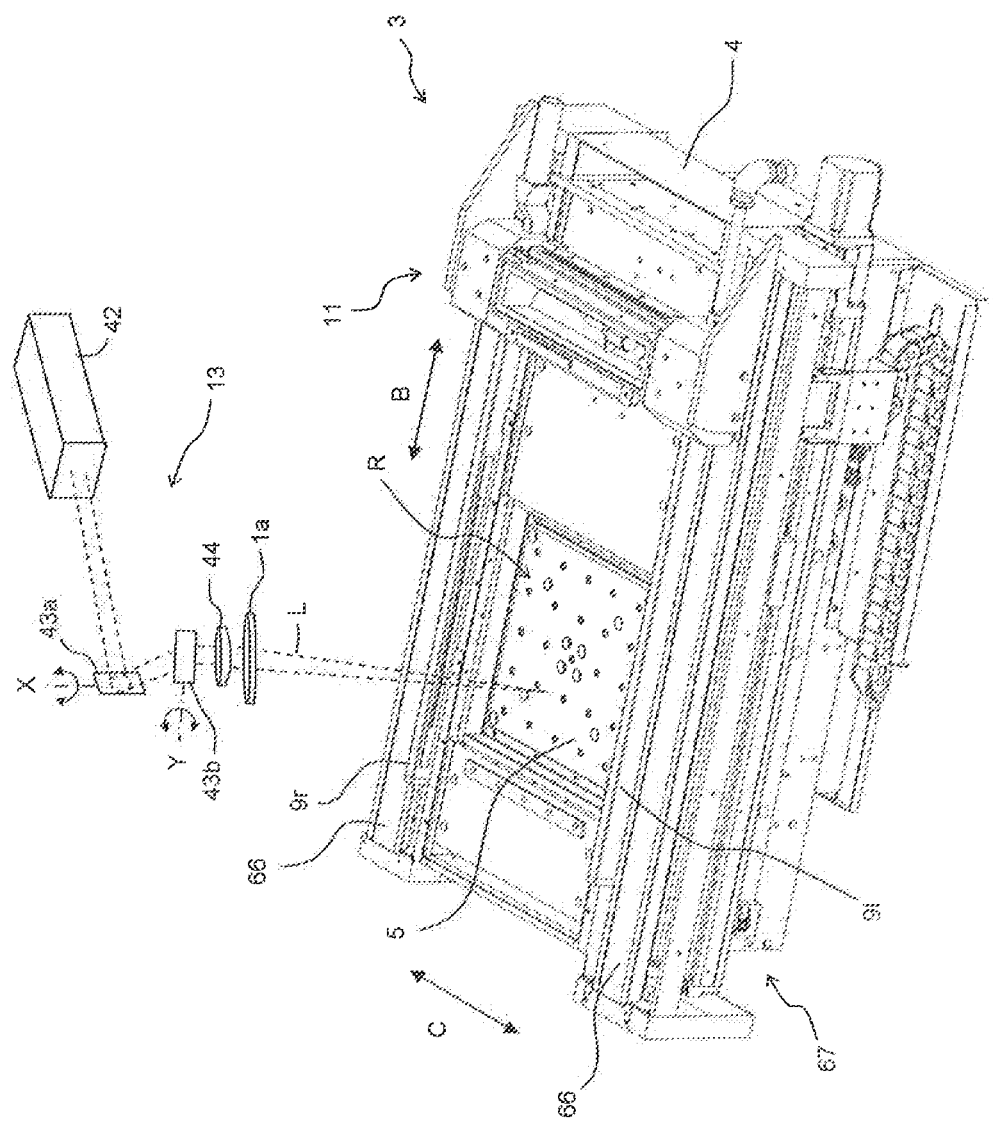
FIG. 8 is a perspective view showing the powder layer forming apparatus 3 and the laser beam emitter 13.

In the front chamber 1f, the powder layer forming apparatus 3 is provided. As shown in FIG. 8, the powder layer forming apparatus 3 comprises a base stage 4 having the molding region R, a recoater head 11 structured so as to be capable of moving in the horizontal uniaxial direction (direction shown by arrow B), and elongated members 9r, 9l provided on both sides of the molding region R along the moving direction of the recoater head 11. The recoater head 11 can be moved by the driving mechanism 67 provided below the slide sheet 66 arranged on the scanning surface of the recoater head 11. The driving mechanism 67 is provided under a circumference atmosphere, and the molding room 1d is separated from the circumference atmosphere by the slide sheet 66. Since the recoater head 11 is moved by the driving mechanism 67, the slide sheet 66 cannot be completely fixed to the base stage 4. Accordingly, a slight gap is formed in between the slide sheet 66 and the base stage 4, causing readily entrance of the circumference atmosphere into the molding room 1d.

In the molding region R, the molding table 5 is provided, the molding table 5 driven by the driving mechanism 31 so as to move in a vertical direction (direction shown by arrow A in FIG. 1). When the lamination molding apparatus is used, the molding plate 7 is placed on the molding table 5, and the material powder layer 8 is formed on the molding table 5.

The powder retaining wall 26 is provided so as to surround the molding table 5, and the non-sintered, material powder is retained in the powder retaining space surrounded by the powder retaining wall 26 and the molding table 5. In the lower side of the powder retaining wall 26, the powder ejecting section 27 capable of discharging the material powder in the powder retaining space is provided. After completion of the lamination molding, the molding table 5 is descended so as to discharge the non-sintered material powder from the powder ejecting section 27. The material powder discharged is guided to the chute 29 by the chute guide 28, and then the material powder is retained in the bucket via the chute 29 (shown in FIG. 2).

As shown in FIGS. 9 to 10, the recoater head 11 comprises a material holding section 11a, a material supplying opening 11b provided at the top surface of the material holding section 11a, and a material discharging section 11c provided at the bottom surface of the material holding section 11a, the material discharging section 11c discharging the material powder in the material holding section 11a. The material powder is supplied to the material supplying opening 11b from the material supplying apparatus 55 shown in FIG. 3.

The material discharging section 11c has a slit shape which elongates in the horizontal uniaxial direction (direction shown by arrow C) crossing orthogonally with the moving direction (direction shown by arrow B) of the recoater head 11. On both sides of the recoater head 11, squeegee blades 11fb and 11rb for forming a material powder layer 6 by planarizing the material powder discharged from the material discharging section 11c are provided. In addition, on both sides of the recoater head 11, fume suction sections 11fs and 11rs for suctioning the fume generated during sintering of the material powder are provided. The fume suction sections 11fs and 11rs are provided along the horizontal uniaxial direction (direction shown by arrow C) crossing orthogonally with the moving direction (direction shown by arrow B) of the recoater head 11. The material powder is, for example, metal powder (iron powder for example) having a sphere shape with an average particle diameter of 20 μm.

The elongated members 9r and 9l are provided with openings along the moving direction (direction shown by arrow 3) of the recoater head 11. One of the openings is used as the inert gas supplying opening, and the other opening is used as the inert gas discharging opening. Accordingly, a flow of inert gas can be made in the direction shown by the arrow C on the molding region R. Therefore, the fume generated in the molding region R can be easily discharged along this flow of the inert gas. Here, in the present specification, "inert gas" is a gas which substantially does not react with the material powder, and nitrogen gas, argon gas, and helium gas can be mentioned for example.

A laser beam emitter 13 is provided above the front chamber 1f. As shown in FIG. 8, the laser beam emitter 13 comprises a laser source 42 to emit the laser beam L, a pair of galvanometer scanners 43a and 43b to perform two dimensional scanning of the laser beam L emitted from the laser source 42, and a condensing lens 44 to condense the laser beam L. The galvanometer scanner (X-axis scanner) 43a scans the laser beam L in the direction shown by arrow B (X-axis direction), and the galvanometer scanner (Y-axis scanner) 43b scans the laser beam L in the direction shown by arrow C (Y-axis correction). Each of the scanners 43a and 43b is controlled of its rotation angle depending on the size of the rotation angle controlling signal. Accordingly, the position irradiated by the laser beam L can be moved to a desired position by altering the size of the rotation angle controlling signal being input to the scanners 43a and 43b. An example of the condensing lens 44 is fθ lens.

The laser beam L which passed through the condensing lens 44 further passes through the window 1a provided to the front chamber 1f. Then, the material powder layer 8 formed in the molding region R is irradiated with the laser beam L. The type of the laser beam L is not limited so long as it can sinter the material powder. For example, $CO_2$ laser, fiber laser, YAG laser and the like can be used. The window 1a is formed with a material capable of transmitting the laser beam L. For example, in a case where the laser beam L is fiber laser or YAG laser, the window $1a$ can be structured with a quartz glass.

On the upper surface of the front chamber $1f$, the fume diffusing section 17 is provided so as to cover the window $1a$. The fume diffusing section 17 is provided with a cylindrical housing $17a$ and a cylindrical diffusing member $17c$ arranged in the housing $17a$. An inert gas supplying space $17d$ is provided in between the housing $17a$ and the diffusing member $17c$. Further, on the bottom surface of the housing $17a$, an opening $17b$ is provided at the inner portion of the diffusing member $17c$. The diffusing member $17c$ is provided with a plurality of pores $17e$, and the clean inert gas supplied into the inert gas supplying space $17d$ is filled into a clean space $17f$ through the pores $17e$. Then, the clean inert gas filled in the clean space $17f$ is discharged towards below the fume diffusing section 17 through the opening $17b$.

Next, the inert gas supplying system and the fume discharging system are explained.

The inert gas supplying system to supply the inert gas into the front chamber $1f$ is connected with a first inert gas supplying apparatus $15a$ and a fume collector 19. The first inert gas supplying apparatus $15a$ has a function to supply the inert gas, and is an apparatus having a film-type nitrogen separator to collect the nitrogen gas from the circumference atmosphere, for example. As the first inert gas supplying apparatus $15a$, the one capable of controlling the concentration of the inert gas is preferable. The lamination molding is performed in the molding room $1d$ provided in the front chamber $1f$. Accordingly, when the concentration of the inert gas supplied to the first inert gas supplying apparatus $15a$ is low, the quality of the molded product becomes low. The fume collector 19 comprises duct boxes 21 and 23 provided at its upper stream side and its lower stream side, respectively. The gas (inert gas containing fume) discharged, from the front chamber $1f$ is sent to the fume collector 19 through the duct box 21. Then, fume is removed in the fume collector 19, and the cleaned inert gas is sent to the front chamber $1f$ through the duct box 23. According to such constitution, the inert gas can be recycled.

As shown in FIG. 1, the inert gas supplying system to supply the inert gas to the front chamber $1f$ is connected with, the upper supplying opening $1b$ of the front chamber $1f$, the inert gas supplying space $17d$ of the fume diffusing section 17, and the elongated member 91. The inert gas is supplied into the molding room $1d$ of the front chamber $1f$ through, the upper supplying opening $1b$. The inert gas supplied into the elongated member 91 is discharged onto the molding region R through the opening.

In the present embodiment, the inert gas from the fume collector 19 is sent to the upper supplying opening $1b$, and the inert gas from the first inert gas supplying apparatus $15a$ is supplied to the inert gas supplying space $17d$ and to the elongated member 91. Although there is a possibility that the inert gas from the fume collector 19 contains residual fume, the constitution of the present embodiment does not permit the inert gas from the fume collector 19 be supplied into the space which requires especially high cleanliness (clean space $17f$ and the space at the periphery of the molding region R). Accordingly, the effect of the residual fume can be minimized.

As shown in FIG. 1, the fume discharging system is connected with the upper discharging opening $1c$ of the front chamber $1f$, the fume suction sections $11fs$ and $11rs$ of the recoater head 11, and the elongated member $9r$. Since the inert gas containing the fume in the molding room $1d$ of the front chamber if is discharged through the upper discharging opening $1c$, a flow of inert gas flowing from the upper supplying opening $1b$ towards the upper discharging opening $1c$ is formed in the molding room $1d$. The fume suction sections $11fs$ and $11rs$ of the recoater head 11 can suction the fame generated in the molding region R when the recoater head 11 passes over the molding region R. Here, the inert gas containing the fume is discharged out of the front chamber $1f$ through the opening of the elongated member $9r$. The fume discharging system is connected with the fume collector 19 through the duct, box 21, and the inert gas after removal of the fume by the fume collector 19 is recycled.

The second inert gas supplying apparatus $15b$ is connected to the inert gas supplying system to supply the inert gas to the rear chamber $1r$. The second inert, gas supplying apparatus $15b$ can be an apparatus having a similar structure as the first inert gas supplying apparatus $15a$, however, since the importance of controlling the concentration of the inert gas in the driving device housing room $1e$ provided in the rear chamber $1r$ is low, the second inert gas supplying apparatus $15b$ need not have the function to control the concentration of the inert gas. As shown in FIG. 1, the inert gas supplying system to supply the inert gas to the rear chamber $1r$ is connected to the supplying opening $1g$ of the rear chamber $1r$. The rear chamber $1r$ is not provided with the fume discharging system, and the inert, gas supplied into the rear chamber $1r$ is supplied into the molding room $1d$ via the communicating section provided in the partitioning section as aforementioned.

The first and second inert gas supplying apparatuses $15a$ and $15b$, and the fume collector 19 are connected to the controlling apparatus 20. A signal to show ON/OFF of the power source of the lamination molding apparatus 10, signals from the sensors provided in the first inert gas supplying apparatus $15a$ and the molding room $1d$, and a sensor to show whether the door 61 is opened or closed, are input to the controlling apparatus 20. The controlling apparatus 20 controls the first and second inert gas supplying apparatuses $15a$ and $15b$, and the fume collector 19 in accordance with these signals.

For example, the controlling apparatus 20 controls the second inert gas supplying apparatus $15b$ so that the inert gas is supplied to the driving device housing room $1e$ when the power source of the lamination molding apparatus 10 is ON, and so that the inert gas is supplied to the molding room $1d$ when the door 61 allowing access to the molding room $1d$ is closed. That is, the driving device housing room $1e$ is continuously supplied with the inert gas when the power source of the lamination molding apparatus 10 is ON, regardless of whether the door 61 is opened or closed. Accordingly, the driving device housing room $1e$ is always filled with the inert gas. The inert gas supplied to the molding room $1d$ is terminated when the door 61 is opened. When the door 61 is opened, the inert gas supplied to the molding room $1d$ would diffuse to the atmosphere. Therefore, the inert gas can be prevented from being wasted by terminating the supply of the inert gas when the door 61 is opened.

The amount of the inert gas supplied to the molding room $1d$ is preferably larger than the amount of the inert gas supplied to the driving device housing room $1e$. As such, the molding room $1d$ is purged with the inert gas, allowing to further improve the cleanliness in the molding room $1d$.

The fume collector 19 can continuously discharge the fume when the power source of the lamination molding apparatus 10 is ON, can discharge the fume only when the door 61 is closed, or can discharge the fume only when the lamination molding is performed. When the fume collector 19 is discharging the fume, the molding room 1d is locally depressurized at the vicinity of the fume discharging openings 1c, 11fs, 11rs, and 9r. Accordingly, atmospheric air tend to enter the molding room 1d from the gap between the slide sheet 66 and the base stage 4, and from the gap between the X-axis bellows 53 and the dividing panel 59. When the driving device housing room 1e was not filled with the inert gas, the air entering the molding room 1d from the gap between the X-axis bellows 53 and the dividing panel 59 would lower the concentration of the inert gas in the dividing panel 59, which was problematic. In the present embodiment, the inert gas is introduced also into the driving device housing room 1e, and thus such problem is solved. In addition, in the present embodiment, the size of the communicating section provided to allow communication between the driving device housing room 1e and the size of the molding room 1d arranged adjacent to each other allows to maintain the pressure of the driving device housing room 1e supplied with the inert gas to be higher than the pressure of the molding room 1d. Accordingly, since the inert gas is supplied into the driving device housing room 1e, the pressure in the driving device housing room 1e is higher than the pressure of the circumference atmosphere. Accordingly, when the molding room 1d is depressurized, the inert gas in the driving device housing room 1e is preferentially taken into the molding room 1d, thereby suppressing the atmospheric air from flowing through the gap between the slide sheet 66 and the base stage 4. Therefore, the concentration of the inert gas in the molding room 1d can be raised swiftly, and the concentration value of the inert gas in the molding room 1d can be raised higher than that of a case where the inert gas is not supplied to the driving device housing room 1e.

Next, the lamination molding method using the afore-mentioned lamination molding apparatus will be explained.

Here, a case where the molded product 47 having the three-dimensional profile as shown in FIG. 11A is formed by lamination molding is taken as an example for the explanation.

Figure 12:
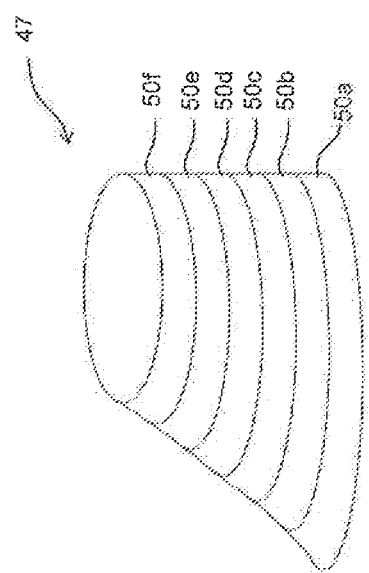
FIG. 12 is a perspective view showing the molded product 47 obtained by laminating the sintered layers 50.
Figure 13:
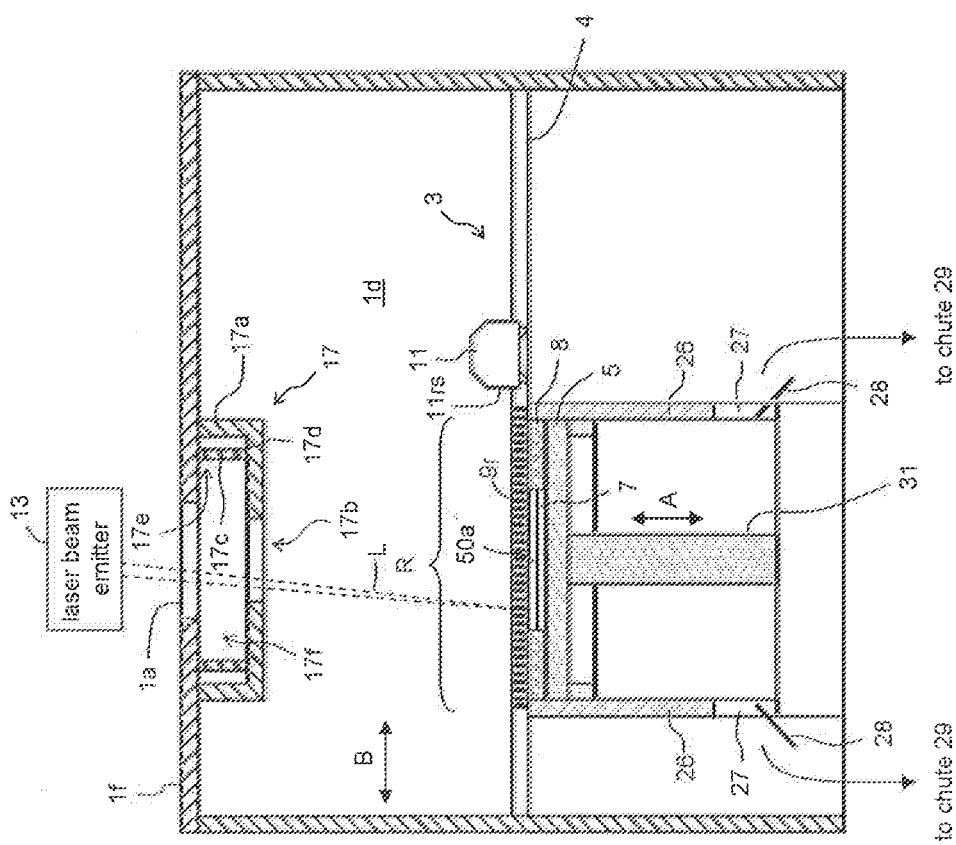
FIG. 13 is an explanatory drawing showing the lamination molding method which uses the lamination molding apparatus 10.
Figure 14:
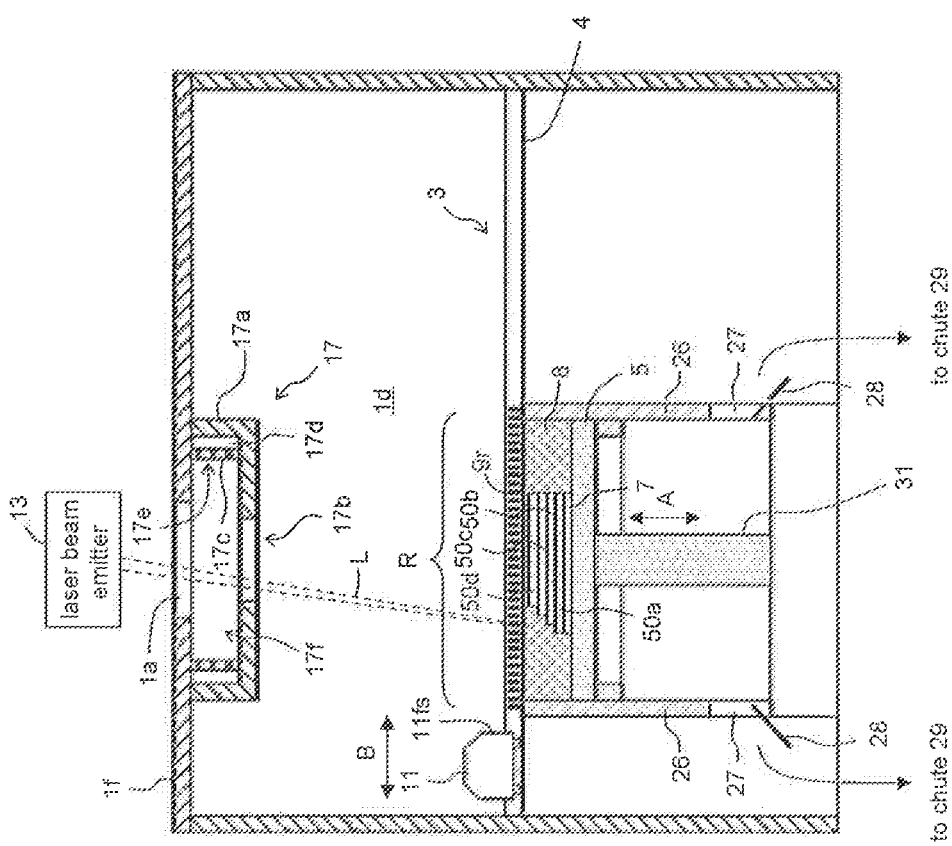
FIG. 14 is an explanatory drawing showing the lamination molding method which uses the lamination molding apparatus 10.

First, as shown in FIGS. 11B to 11C, a molded product 47 having the desired three-dimensional profile is molded using a computer, thereby obtaining a model 48 of the molded product. Then the model 48 of the molded product is sliced by a horizontal plane with a predetermined unit height, thereby forming sliced layers of 49a, 49b, . . . 49f. Subsequently, as shown in FIGS. 12 to 14, the material powder layer 8 is irradiated with the laser beam L so as to selectively sinter the material powder, thereby forming the sintered layers of 50a, 50b, . . . 50f having the profile corresponding to the sliced layers of 49a, 49b, . . . 49f respectively. The sintered layers are also fused with each other, thereby forming the molded product 47. The region surrounded by the outline profile of each of the sliced layers of 49a, 49b, . . . 49f is the region to be irradiated with the laser beam L, f 45a, 45b, . . . 45f (hereinafter referred to as irradiation region). The sliced layers, sintered layers, and irradiation region are also referred to as sliced layers 49, sintered layers 50, and irradiation region 45, respectively.

That is, the molded product 47 can be formed by repeating selective sintering of the material powder of the material powder layer 8 in the irradiation region 45. This is accomplished by irradiating the irradiation region 45 with the laser beam L. Here, the irradiation region 45 is surrounded by the outline profile of each of the sliced layers 49 of the model 48 of the molded product.

Next, the method for forming the sintered layers 50 will be explained in detail.

First, the power source of the lamination molding apparatus is turned ON in a condition where the door 61 is closed, and then the controlling apparatus 20 operates the first and second inert gas supplying apparatuses 15a and 15b and the fume collector 19. Accordingly, the inert gas is supplied to molding room 1d and the driving device housing room 1e, and the fume is discharged therefrom.

The lamination molding is started when the oxygen concentration in the molding room 1d reaches below a predetermined value (for example, 3%).

First, the height of the molding table 5 is adjusted to an adequate position while the molding plate 7 is mounted on the molding table 5. In such condition, the recoater head 11 having the material holding section 11a filled with the material powder is moved from the left side to the right side of the molding region R (in the direction shown by the arrow B in FIG. 2). Accordingly, the first layer of the material powder layer 8 is formed on the molding plate 7.

Subsequently, a prescribed portion of the material powder layer 8 is irradiated with the laser beam L, thereby sintering the portion of the material powder layer 8 irradiated with the laser beam. Accordingly, the first sintered layer 50a is obtained as shown in FIG. 13.

Next, the height of the molding table 5 is descended by the thickness of one layer of the material powder layer 8, followed by moving of the recoater head 11 from the right side to the left side of the molding region R. Accordingly, the second material powder layer 8 is formed on the sintered layer 50a.

Subsequently, in a similar manner as described, the prescribed portion of the material powder layer 8 is irradiated with the laser beam L, thereby sintering the portion of the material powder layer 5 irradiated with the laser beam. Accordingly, the second sintered layer 50b is obtained as shown in FIG. 14.

By repeating the afore-mentioned procedures, the third sintered layer 50c, the fourth sintered layer 50d, and the sintered layers thereafter are formed. The neighboring sintered layers are firmly fixed with each other.

A mechanical processing is performed when predetermined number of sintered layers (for example, 10 layers) are formed, by moving the processing head 57 three-dimensionally with respect to the sintered body obtained.

After the sintered body is subjected to the mechanical processing, formation of the material powder layer 8 and irradiation of the material powder layer 8 with the laser beam are repeated, thereby performing the lamination molding.

After completion of the lamination molding, the molding table 5 is descended, thereby discharging the non sintered material powder from the powder ejecting section 27.

Subsequently, after discharging the non-sintered material powder, the molding table 5 is raised to a predetermined position. In such condition, the door 61 is opened, and operation such as taking the molded product 47 out or cleaning of the interior of the molding room 1d, is performed. When the controlling apparatus 20 detects that the door 61 has been opened, the supply of the inert gas from the first inert gas supplying apparatus 15a is terminated.

After completion of the operation, when the controlling apparatus 20 detects that the door 61 has been closed, the supply of the inert gas from the first inert gas supplying apparatus 15a is conducted again. Then, when the oxygen concentration in the molding room 1d reaches below the predetermined value (for example, 3%), the lamination molding is started. In the present embodiment, the inert gas is supplied to the driving device housing room 1e. Therefore, the oxygen concentration in the molding room 1d is lowered swiftly, the time required until starting the lamination molding after closing the door 61 is short, and the oxygen concentration in the molding room 1d can reach an extremely low value.

EXAMPLES

Figure 15:
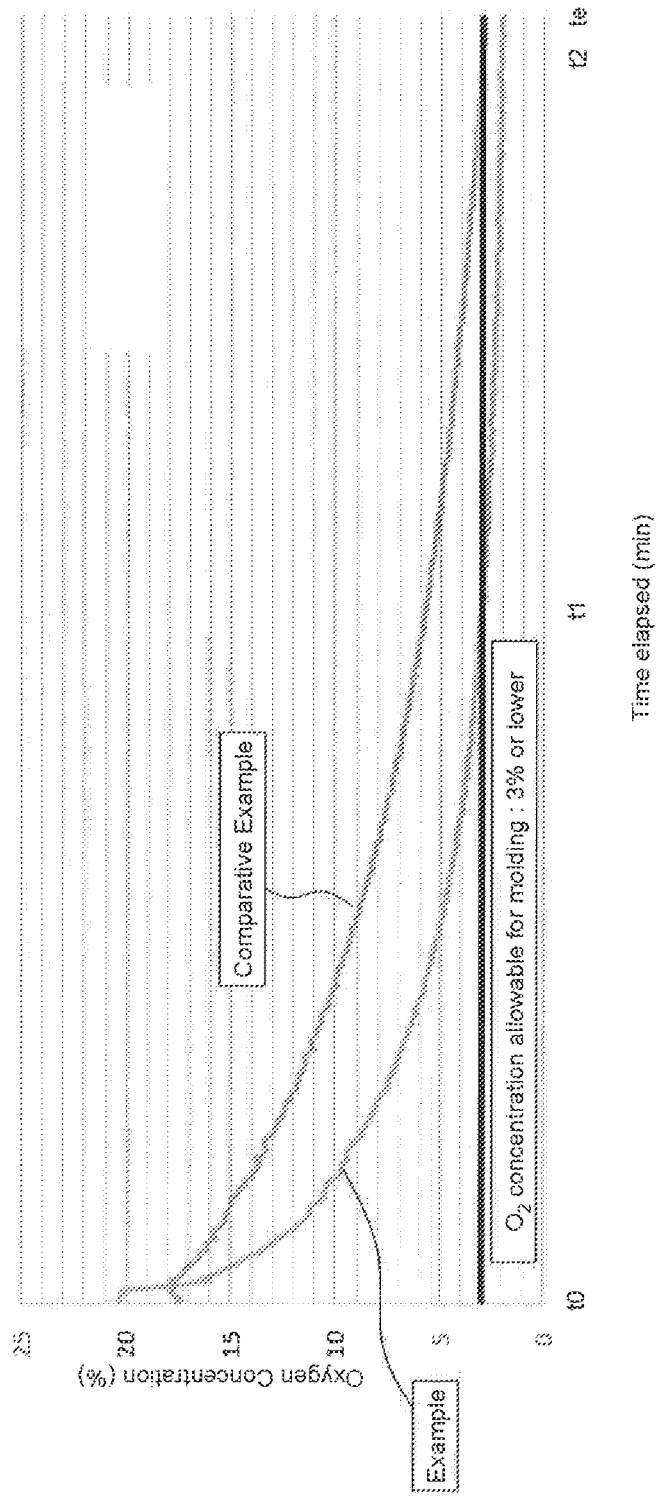
FIG. 15 is a view showing the change in the oxygen concentration in the molding room 1d when nitrogen gas is supplied with the conditions of the Examples and Comparative Examples.

Regarding the lamination molding apparatus 10 described in the afore-mentioned embodiment, time required for the inert gas to reach the predetermined concentration and stabilize was measured with the following conditions. In the Examples, the door 61 was kept closed, and nitrogen gas was supplied to the molding room 1d and to the driving device housing room 1e from the first inert gas supplying apparatus 15a and the second inert gas supplying apparatus 15b, respectively. The measurement was performed for several times with the same inert gas supplying conditions, and was also performed for several times by altering the gas supplying conditions. Here, the amount of gas supplied from the first inert gas supplying apparatus 15a is made larger than the amount of gas supplied from the second inert gas supplying apparatus 15b by the amount of inert gas required to purge the molding room 1d. In the Comparative Examples, nitrogen gas was supplied from the first inert gas supplying apparatus 15a only to the molding room 1d with the same predetermined amount of flow as the Examples. Average results obtained for the Examples and Comparative Examples by measuring the oxygen concentration in the molding room 1d by time is shown in FIG. 15. As shown in FIG. 15, in the Examples, the oxygen concentration reached 3% with approximately 15 (t1) minutes even when the supplying gas pressure of the inert gas was 0.7 MPa, and the oxygen concentration further decreased. On the other hand, the Comparative Examples required approximately 30 minutes (t2) for the oxygen concentration to reach 3%. Here, the time required for the concentration of the inert gas in the molding room 1d to reach a predetermined concentration should alter depending on the volume of the molding room 1d and the gas supplying conditions such as the gas pressure or the amount of gas flow of the inert gas being supplied. Therefore, the difference between the Examples and the Comparative Examples (conventional techniques) would alter. The specific time shows average results of the Examples with respect to the Comparative Example (conventional techniques).

EXPLANATION OF SYMBOLS

1: chamber
1d: molding room
1e: driving device housing room
3: powder layer forming apparatus
5: molding table
8: material powder layer
11: recoater head
13: laser beam emitter
17: fume diffusing section
26: powder retaining wall
27: powder discharging section
28: chute guide
29: chute
31: driving mechanism
32: powder retaining space
42: laser source
43a, 43b: galvanometer scanner
44: condensing lens
45: irradiation region
47: molded product
48: model of molded product
49: sliced layer
50: sintered layer
52: driving device
53: X-axis bellows
57: processing head
58: Y-axis bellows
59: dividing panel
60: spindle head
63: holding frame
L: laser beam Although various exemplary embodiments have been shown and described, the invention is not limited to the embodiments shown. Therefore, the scope of the invention is intended to be limited solely by the scope of the claims that follow.

What is claimed is:
1. A lamination molding apparatus, comprising:
a molding room covering a predetermined molding region and filled with an inert gas having a predetermined concentration;
a laser beam emitter to irradiate a predetermined portion of a material powder layer formed on the molding region with a laser beam, thereby sintering the material powder at a position of irradiation to form a sintered body;
a processing head structured to be capable of being moved in the molding room, the processing head providing a machine processing to the sintered body;
a driving device housing room provided adjacent to the molding room, the driving device housing room housing a driving device moving the processing head;
a partitioning section to partition the molding room from the driving device housing room;
a discharging section to discharge gas in the molding room; and
an inert gas supplying apparatus to supply the inert, gas to both of the molding room and to the driving device housing room;
wherein a communicating section is in the partitioning section, the communicating section allowing communication between, the driving device housing room and the molding room; and
the communicating section has a size allowing to maintain a pressure of the driving device housing room supplied with the inert gas to be higher than a pressure of the molding room.
2. The lamination molding apparatus of claim 1, further comprising:
a first inert gas supplying apparatus to supply the inert gas to the molding room; and
a second inert gas supplying apparatus to supply the inert gas to the driving device housing room.
3. The lamination molding apparatus of claim 2, wherein the first inert gas supplying apparatus is configured to control the concentration of the inert gas; and
the second inert gas supplying apparatus is not configured to control the concentration of the inert gas.
4. The lamination molding apparatus of claim 1, wherein an amount of the inert gas supplied to the molding room is larger than an amount of the inert gas supplied to the driving device housing room.

5. The lamination molding apparatus of claim 1, wherein the inert, gas is supplied to the driving device housing room when a power source of the lamination molding apparatus is turned on; and the inert gas is supplied to the molding room when a door allowing access to the molding room is closed.

6. The lamination molding apparatus of claim 1, wherein the partitioning section comprises bellows capable of extending and folding in a direction parallel to a boundary surface of the driving device housing and the molding room; and the processing head is capable of moving in an extending and folding direction of the bellows.

7. The lamination molding apparatus of claim 1, wherein the material powder layer is formed by moving a recoater head supplying the material powder on the molding region in the molding room.

8. A lamination molding apparatus, comprising:

a molding room covering a predetermined molding region and filled with an inert gas having a predetermined concentration;

a laser beam emitter to irradiate a portion of a material powder layer formed on the molding region with a laser beam, thereby sintering the material powder at a position of irradiation to form a sintered body;

a processing head configured to be moved in the molding room, the processing head providing a machine processing to the sintered body;

a driving device housing room provided adjacent, to the molding room, the driving device housing room, housing a driving device moving the processing head;

a partitioning section to partition the molding room from the driving device housing room, a discharging section to discharge gas in the molding room; and an inert gas supplying apparatus to supply the inert gas to both of the molding room and to the driving device housing room; wherein a communicating section is in the partitioning section, the communicating section allowing communication between the driving device housing room and the molding room; and the communicating section has means for maintaining a pressure of the driving device housing room supplied with the inert gas to be higher than a pressure of the molding room.

\* \* \* \* \*